United States Patent [19]

Ebner et al.

[11] Patent Number: 5,788,176

[45] Date of Patent: Aug. 4, 1998

[54] SAFETY BELT RETRACTOR WITH BELT TENSIONER ACTING ON THE BELT REEL

[75] Inventors: Ralf Ebner, Gschwend; Volker Holzapfel, St. Wendel; Günter Weyhmüller, Alfdorf, all of Germany

[73] Assignee: TRW Occupant Restraint Systems GmbH, Alfdorf, Germany

[21] Appl. No.: 820,144

[22] Filed: Mar. 19, 1997

[30] Foreign Application Priority Data

Mar. 20, 1996 [DE] Germany ............... 296 05 200 U

[51] Int. Cl.⁶ .................. B60R 22/28; B60R 22/46
[52] U.S. Cl. .............. 242/374; 242/379.1; 242/382.6
[58] Field of Search .................... 242/374, 376.1, 242/379.1, 382.6; 280/805, 806; 297/470–472, 478

[56] References Cited

U.S. PATENT DOCUMENTS

| | | | |
|---|---|---|---|
| 5,344,095 | 9/1994 | Frei | 242/374 |
| 5,526,996 | 6/1996 | Ebner et al. | 242/374 |
| 5,628,469 | 5/1997 | Fohl | 242/374 |
| 5,660,346 | 8/1997 | Dick | 242/382.6 |

FOREIGN PATENT DOCUMENTS

| | | |
|---|---|---|
| 4000313 | 7/1991 | Germany. |
| 4227781 | 2/1994 | Germany. |

*Primary Examiner*—John M. Jillions
*Attorney, Agent, or Firm*—Tarolli, Sundheim, Covell, Tummino & Szabo

[57] ABSTRACT

A safety belt retractor with a belt tensioner acting on a belt reel via a first coupling mechanism includes a housing, a vehicle and/or belt webbing-sensitive automatic blocking device for the belt reel and a second coupling mechanism which establishes a force flow between the housing and the belt reel after the belt has been tensioned and upon movement of the belt reel in the direction of belt unwinding in the event of the belt reel. The first coupling mechanism is connected on the power output side and the second coupling mechanism is connected on the power input side to the first end of a torsion bar whose second end is connected to the belt reel. A deactivation device connected to the second coupling mechanism is provided for the automatic blocking device. At least one radially yieldable bearing is associated with the second coupling mechanism which allows parts of the second coupling mechanism to be moved towards each other by the tensioning process so that said coupling mechanism reaches an engaged condition.

18 Claims, 8 Drawing Sheets

SAFETY BELT RETRACTOR WITH BELT TENSIONER ACTING ON THE BELT REEL

BACKGROUND OF THE INVENTION

The invention relates to a safety belt retractor with a belt tensioner acting on a belt reel.

With a belt retractor known from DE 42 27 781 A1 a limited return rotation of the belt reel takes place after tensioning is completed whereby the torsion bar is plastically deformed, so that a desired energy transformation takes place during the sudden forward movement of the vehicle occupants after belt tensioning is completed. This consumes energy and the peaks of load occurring in the belt webbing are largely absorbed. In order to put the automatic blocking device, which typically has a pawl to block the belt reel, out of operation in the event of a forward movement thus permitting the torsion bar to turn the deactivation device is provided on an outer ring of the second coupling mechanism in the form of a radial cam which is turned together with the outer ring in the initial phase of the forward movement when the second coupling mechanism engages, thus disengaging the pawl. The first and the second coupling mechanisms are designed as ratchet couplings which however only engage as of a certain rotational acceleration.

BRIEF SUMMARY OF THE INVENTION

The invention provides a belt retractor wherein the relevant parts of the second coupling mechanism engage each other immediately after tensioning is completed to avoid possible delays. In accordance with the invention, a safety belt retractor has a housing, a belt reel rotatable in a belt winding and a belt unwinding direction, a belt wound around the belt reel, an automatic blocking device for the belt reel, a torsion bar which has first and second opposite ends, the second end being connected to the belt reel. Furthermore, the safety belt retractor includes a belt tensioner which acts on the belt reel and a first coupling mechanism arranged between the belt tensioner and the belt reel. The first coupling mechanism is connected to the first end of the torsion bar and adapted to establish a force flow between the belt tensioner and the belt reel upon actuation of the belt tensioner. A second coupling mechanism being part of the safety belt retractor is connected to the first end of the torsion bar and has a plurality of parts adapted to engage each other and to establish a force flow between the housing and the belt reel after the belt has been tensioned and upon movement of the belt reel in the unwinding direction. At least one radially yieldable bearing associated with the second coupling mechanism allows the parts of the second coupling mechanism to be moved radially towards each other during tensioning of the belt and to engage each other. A deactivation device for the automatic blocking device is connected to the second coupling mechanism. The automatic blocking device is a vehicle and/or belt webbing-sensitive blocking device as usually used with safety belt retractors.

The invention is based on the perception that between the end of the tensioning process and the subsequent forward movement of the vehicle occupant, there is a short period of time in which the second coupling mechanism is not yet in an engaged condition, since it only comes in its blocked position when a certain rotational acceleration has been reached after the beginning of the forward movement. The belt retractor in accordance with the invention does not use the rotational acceleration arising from the forward movement of the vehicle occupant to bring the second coupling mechanism into its blocked position. On the contrary, the belt retractor in accordance with the invention uses the tensioning process itself to allow a movement of parts of the second coupling mechanism towards each other by means of a radially yielding bearing, so that the second coupling mechanism reaches its blocked position during the tensioning process and then remains in this blocked position. Since the first and the second coupling mechanisms have different free-running directions, the second coupling mechanism can run on when the first coupling mechanism is in its blocked position during the tensioning process, although it has already reached its blocked position for the rotation in the opposite direction. The second coupling mechanism is therefore available for torque transmission even in engaged position at the beginning of the forward movement. The second coupling mechanism can also be designed substantially more simply, since pawls are no longer required. The yielding bearing can be, for example, a radially movable bearing or an elastically deformable bearing.

In accordance with the favourable embodiment, the radial movement of the parts towards each other is effected through the force of the belt tensioner with a counterforce through the belt webbing. The direction of action of the belt tensioner in relation to the direction of the belt unwinding must be selected in such a way that the belt reel is supported by the belt webbing during tensioning so that the radial movement of the parts towards each other can take place. In this embodiment, additional parts allowing the force to be supported during tensioning and thus allowing a radial movement are no longer required.

The second coupling mechanism preferably comprises an outer ring and an inner wheel drivingly connected to this ring when the coupling mechanism is engaged, and these can have internal or external coupling toothing in the form of saw-toothing. This saw-toothing allows the outer ring to be rotated with respect to the inner wheel in one rotational direction, whereas in the opposite rotational direction, rotational engagement occurs due to the positive connection. In this particularly simple embodiment, therefore, only the inner wheel and the outer ring need to be moved radially with respect to each other in such a way that the sawtoothings engage with each other.

The radially yielding bearing may have different designs and be coupled to different parts. For example, the inner wheel may be radially yieldingly mounted. In particular, the inner wheel may be made of plastic material and have a flexible section forming the yielding bearing. In addition, other parts may also be mounted flexibly, that is, radially movable, in that in accordance with a preferred embodiment, the yielding mounting comprises a flexible plastic part, which, moreover, may also have recesses to facilitate radial movement.

Furthermore, the torsion bar itself can be radially yieldingly mounted on the belt tensioner side, so that the tensioning process results in a radial shift of the torsion bar and movement of parts of the second coupling mechanism mounted on it. In the preferred embodiment, the torsion bar is held by means of a radially yielding bearing plate.

A further means of permitting the radial movement of parts of the second coupling mechanism in relation to each other consists in mounting the belt reels radially yieldingly, for example in that they have a bearing extension which is flexible.

In accordance with one embodiment, the first coupling mechanism is designed as a ratchet coupling, whereby the inner wheel of the second coupling mechanism preferably

BRIEF DESCRIPTION OF THE DRAWINGS

FIG. 1a shows a perspective view of an inner wheel of the belt retractor shown in FIG. 1;

DETAILED DESCRIPTION OF THE INVENTION

In the two embodiments shown in FIGS. 1 to 8 of a belt retractor with a belt tensioner, a belt reel 12 is rotatably mounted between the sides of a load-bearing housing 10. The belt webbing 14 is wound on the belt reel 12. The two embodiments shown of the belt retractor correspond in part to each other, so that the following description of the design of the belt retractor refers to both embodiments, insofar as no differences are indicated.

Figure 1:
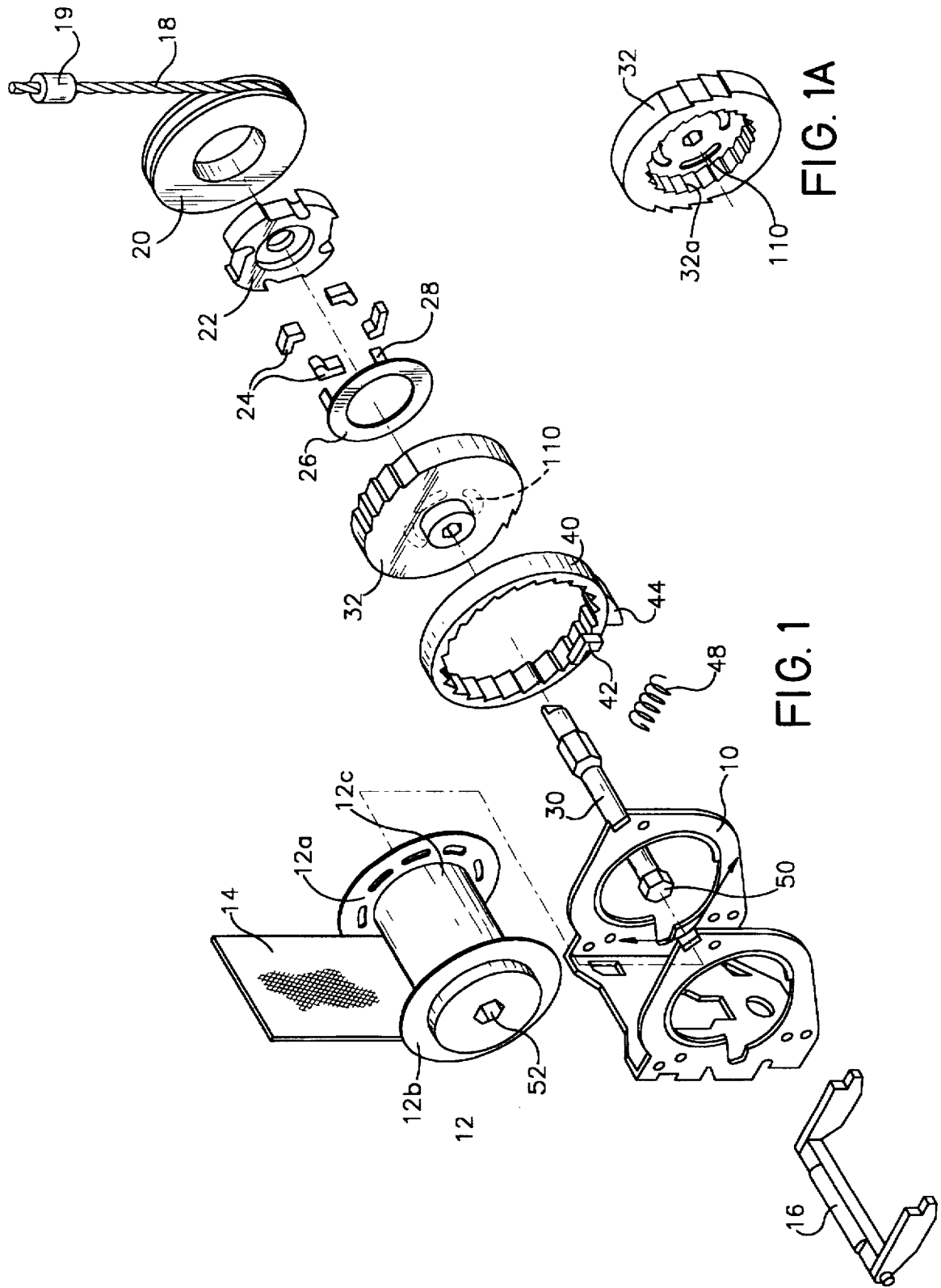
FIG. 1 shows a perspective exploded view of an embodiment of the belt retractor in accordance with the invention in the region between the belt reel and the belt tensioner.

On the left side of the housing 10 as shown in FIG. 1 are a conventional and therefore not illustrated automatic blocking device with a trigger mechanism for blocking the belt reel and a winding spring which engages in the end of the belt reel 12 and which acts on the belt reel 12 in the winding direction of the belt. A pawl 16 blocks the rotation of the belt reel 12 in the unwinding direction of the belt, in a vehicle-sensitive and/or belt webbing-sensitive manner.

On the opposite side of the housing 10 are the functional parts required for the belt tensioning function and a subsequent energy transformation function.

These include a draw cable 18, on which tensile force acts when the belt tensioning drive unit is triggered, for example through a pyrotechnical linear drive unit, an inertial mass, a pretensioned spring or the like. The draw cable 18 engages on the circumference of a cable reel 20, around which it is placed with at least one winding. In accordance with the embodiment and FIGS. 1 and 2, the cable reel 20 is located on a first cylindrical shoulder of a ratchet wheel 22 as part of a first coupling mechanism and positively coupled to the ratchet wheel 22. In the embodiment shown in FIGS. 3 to 8 the cable reel 20 is connected to the ratchet wheel 22 as one piece.

On the surface of its circumference the ratchet wheel 22 has four swivel-mounted pawls 24 spaced in the direction of the circumference. The pawls 24 are offset in pairs by half a tooth pitch in relation to a 90° pitch in order to guarantee secure coupling engagement. Leaf springs 28 are attached to a disk 26 to stress the pawls 24 radially inwards with respect to the ratchet wheel 22, so that these can only swing out by overcoming the spring resistance. The disk 26 is concentrically located on the ratchet wheel 22.

The ratchet wheel 22 is rotatably mounted on one end turned towards the belt tensioner of a torsion bar 30 which is located coaxially in the interior of the belt reel 12.

An inner wheel 32 is formed as one piece with a cylindrical wheel 32a which encompasses the ratchet wheel 22 with an internal coupling toothing allocated to the ratchet wheel 22 and which is coaxially arranged with this around the torsion bar 30 and is positively connected to the torsion bar 30.

The pawls 24 are swivel-mounted on the surface of the circumference of the ratchet wheel 22 in such a way that at a certain rotational acceleration of the first ratchet wheel 22 and the connected cable reel 20 they swing out, engage in the internal coupling toothing of the inner wheel 32 and thus couple the cable reel 20 to the belt reel 12 via the inner wheel 32 and the torsion bar 30.

On its external surface shell the inner wheel 32 has external coupling toothing in the form of saw-toothed gearing, whereby FIG. 1 only shows some of the teeth.

Around the inner wheel 32 is an outer ring 40 with internal coupling toothing in the form of saw-toothed gearing, said ring being located in a bearing device connected with the housing 10. The internal coupling toothing is coarser than that of the external gearing (cf. FIGS. 4 to 8). The teeth of both coupling units are arranged at such an angle that in spite of the contact between the units these slide against each other without torque transmission when the belt is tensioned, engage when the belt webbing is unwound and securely couple the inner wheel 32 and the outer ring 40 with each other.

On the side facing the housing 10, the outer ring 40 has a radial cam 42, which engages the pawl 16 when the outer ring 40 rotates in the belt unwinding direction and moves said pawl downwards into an inactive position. The blocking mechanism is thus disabled.

In addition, the outer ring 40 has a limit stop part 44 on the surface of its circumference. The housing 10 has a limit stop 46 corresponding to this limit stop part 44 on its side facing the belt tensioner (cf. FIG. 5). Between the limit stop part 44 and the limit stop 46 is a pressure spring 48 by means of which the outer ring 40 is prestressed in a direction leading away from the limit stop 46. When the inner wheel 32 engages in the outer ring 40, the latter is rotated against the resistance of the pressure spring until the limit stop part 44 strikes the limit stop 46 and any further rotation of the outer ring 40 is blocked. At its axial end facing away from the belt tensioner, the torsion bar 30 has a knurled head piece 50 which is inserted in a suitably shaped recess 52 of the belt reel 12 to form a positive connection. The belt reel 12 consists essentially of two lateral flanges 12a, 12b and an essentially hollow cylindrical shell 12c, which has a slot for the passage of the belt webbing 14 to be wound on the belt reel 12, said slot not being illustrated here. The torsion bar 30 extends through the hollow cylindrical interior of the shell 12c of the belt reel 12. The end of the belt webbing 14 forms a loop which is pushed on to the torsion bar 30 and which is connected to the belt reel 12 by the knurled head piece 50 in such a way that it cannot rotate. In idle state (cf. FIGS. 2 and 5) the coupling toothings of the outer ring 40 and of the inner wheel 32 as well as the pawls 24 of the ratchet wheel 22 with their assigned inner coupling toothing are disengaged, so that the belt reel 12 with the torsion bar 30 can rotate unimpeded.

As shall be explained later with reference to operation of the belt retractor, the inner wheel 32 is radially movably mounted in such a way that the belt tensioning process leads to a radially outward movement of the inner wheel 32 until the external coupling toothing engage in the internal coupling teeth of the outer ring 40. To permit this radial movement, at least one radially yielding bearing which is assigned to the second coupling mechanism is necessary. The design of the bearings differs in the two embodiments shown. In the embodiment shown in FIG. 2, several radially yielding bearings are provided for, but they do not all necessarily have to be present together in a belt retractor to allow the movement of the inner wheel 32. In the embodiment shown in FIG. 3, on the other hand, only one radially yielding bearing is provided for.

Figure 2:
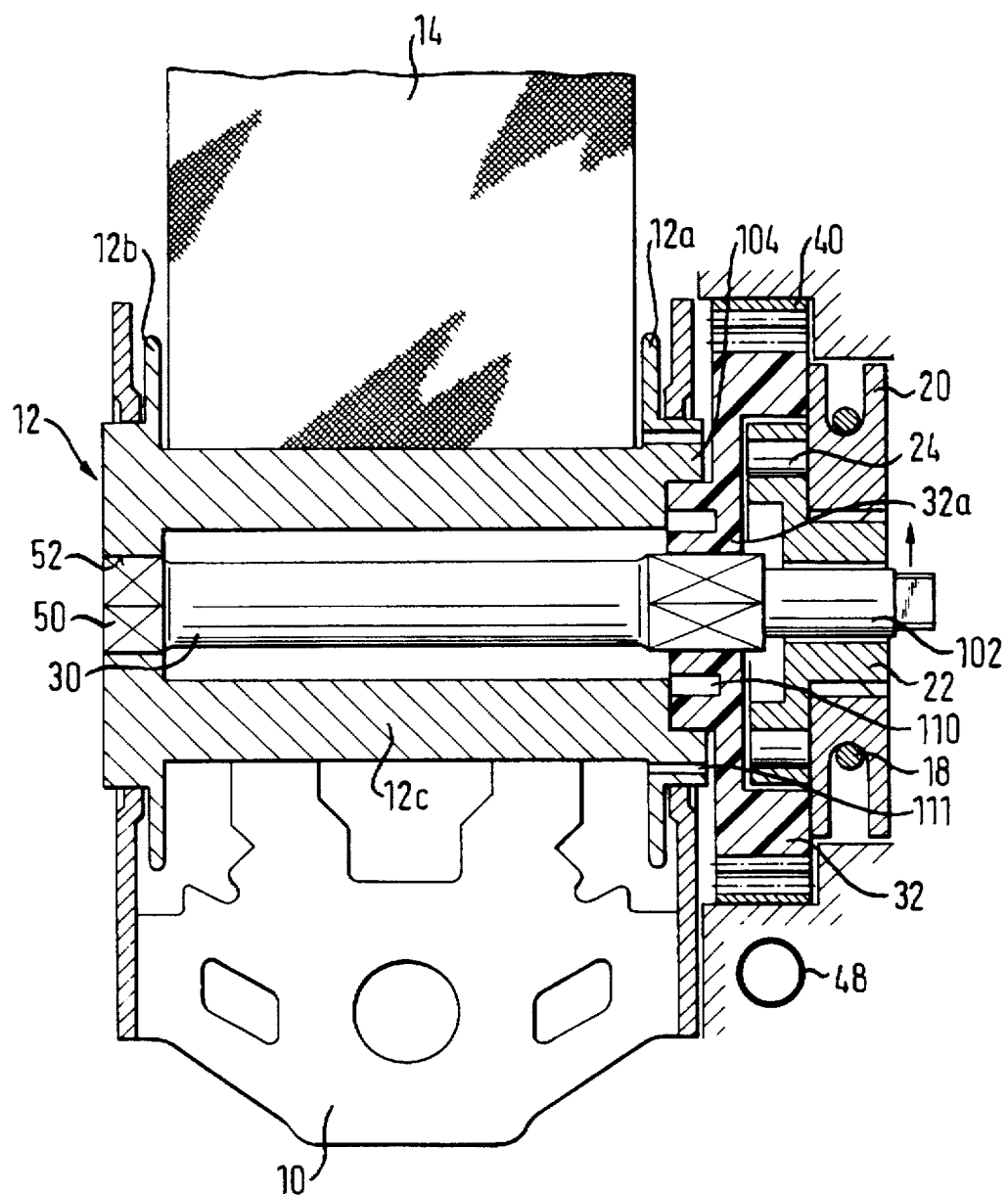
FIG. 2 shows a longitudinal section through the belt reel of the belt retractor shown in FIG. 1 in accordance with a first embodiment with several radially yielding bearings.

In accordance with FIG. 2, a radially flexible bearing is formed by the inner wheel 32 itself, which is manufactured from flexible plastic containing glass fibre reinforcement. The front side of inner wheel 32a as part of the inner wheel 32 has several recesses 110, which can be designed as through or non-through recesses.

Furthermore, the belt reel 12, in which the inner wheel 32, as shown in FIG. 2, can be partly accommodated, is radially yieldingly mounted. To this end, an integrally connected bearing extension 104 has several recesses 111, which extend axially through the bearing extension 104, so that the belt reel and thus all parts mounted in it can be moved radially on the belt tensioner side at a predetermined force.

In the embodiment shown in FIG. 2, in which the individual parts of the first and second coupling mechanisms as well as the torsion bar 30 are mounted in each other, the torsion bar 30 is thus also indirectly radially yieldingly mounted on the belt tensioner side.

Figure 3:
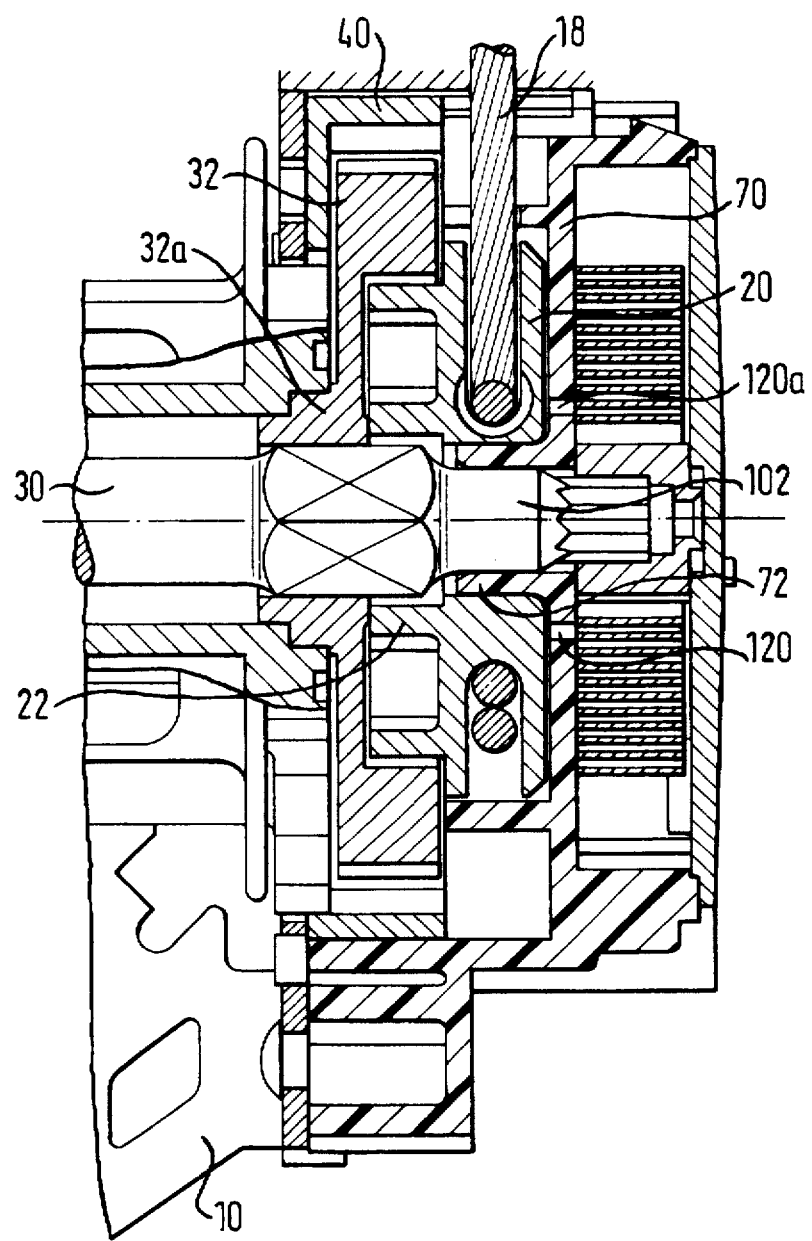
FIG. 3 shows a longitudinal section through a belt reel of a belt retractor on the belt tensioner side in accordance with a second embodiment, corresponding largely to the belt retractor show n in FIG. 1 in normal no-load position.
Figure 4:
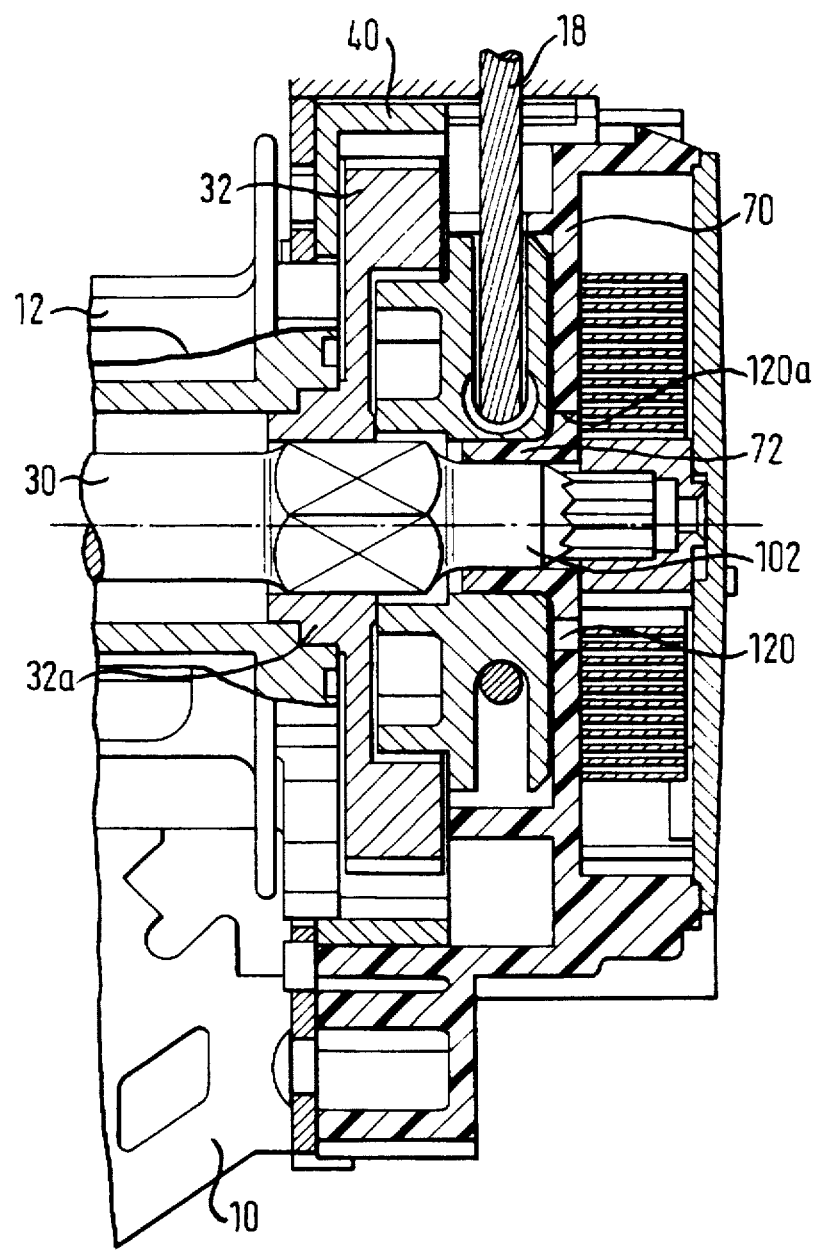
FIG. 4 shows the belt retractor shown in FIG. 3 with the torsion bar radially shifted during belt tensioning.

Alternatively, however, it is also possible, as shown in FIG. 3, to provide for a separate mounting for the torsion bar 30 by elongating the torsion bar extension 102 axially so far outwards that it is accommodated in a radially yielding bearing plate 70 shown in FIG. 4 in a bushing 72 formed there in one piece. The bearing plate 70 is preferably manufactured from plastic, attached to the housing 10 and has several recesses 120 as well as an uppermost recess 120a. The ratchet wheel 22 is rotatably mounted on the external surface shell of the bushing 72. The mounting of the belt reel 12 directly on the housing 10 can even be dispensed with on the belt tensioner side, since the belt reel 12 is indirectly held firmly in position by means of the inner wheel 32, the torsion bar 30 and the bearing plate 70.

Figure 5:
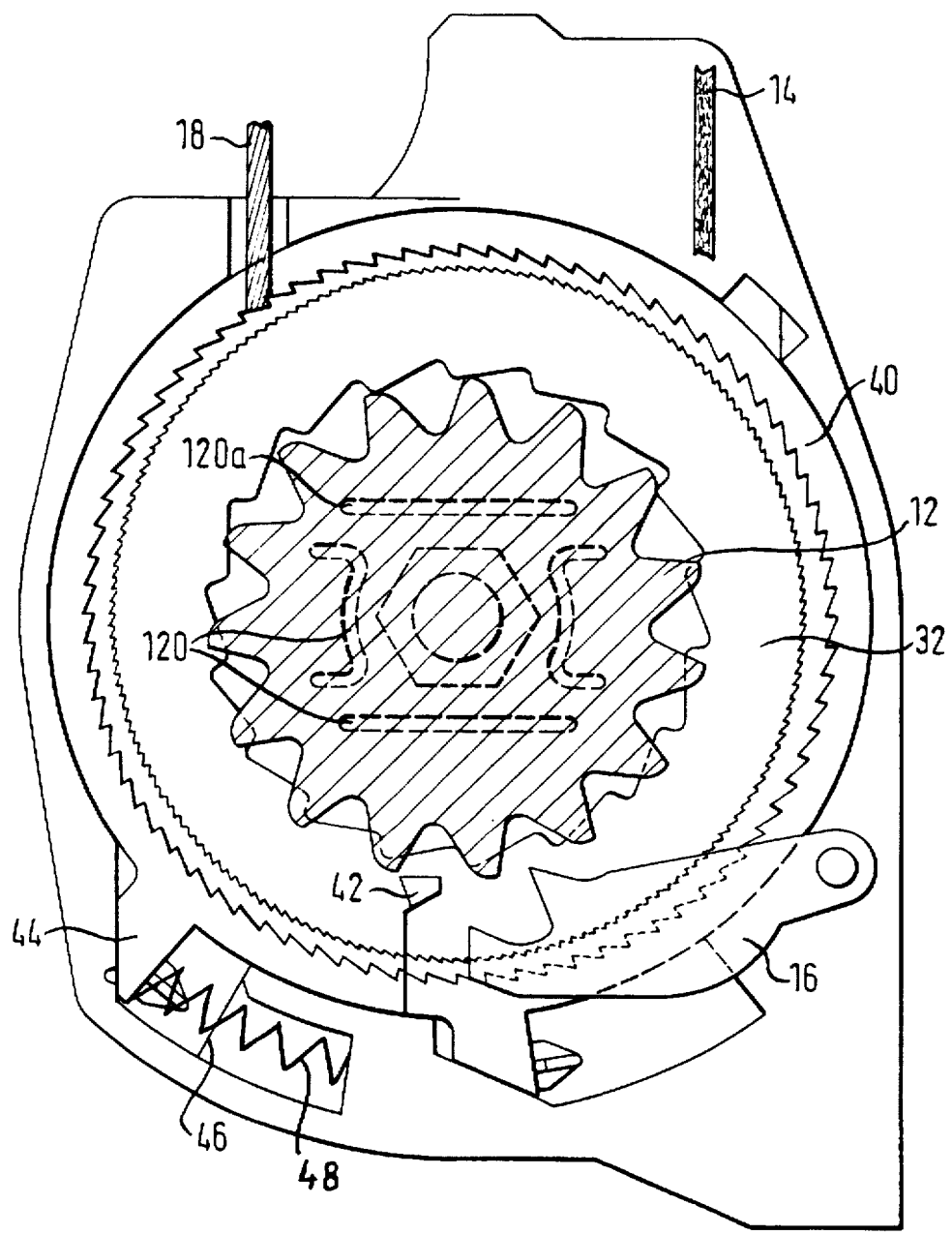
FIG. 5 shows a partial schematic side view of th e belt tensioner in accordance with FIG. 3 with the second coupling mechanism not engaged, whereby in this view parts arranged axially displaced in relation to a cutting plane are projected into the cutting plane.

In both embodiments, therefore, the torsion bar 30 is mounted coaxially to the outer ring 40 in idle state, when the belt reel is not under stress and no tensioning is taking place, so that the external coupling toothing of the inner wheel 32 do not touch the internal coupling toothing of the outer ring 40. This is illustrated in FIG. 5.

Figure 6:
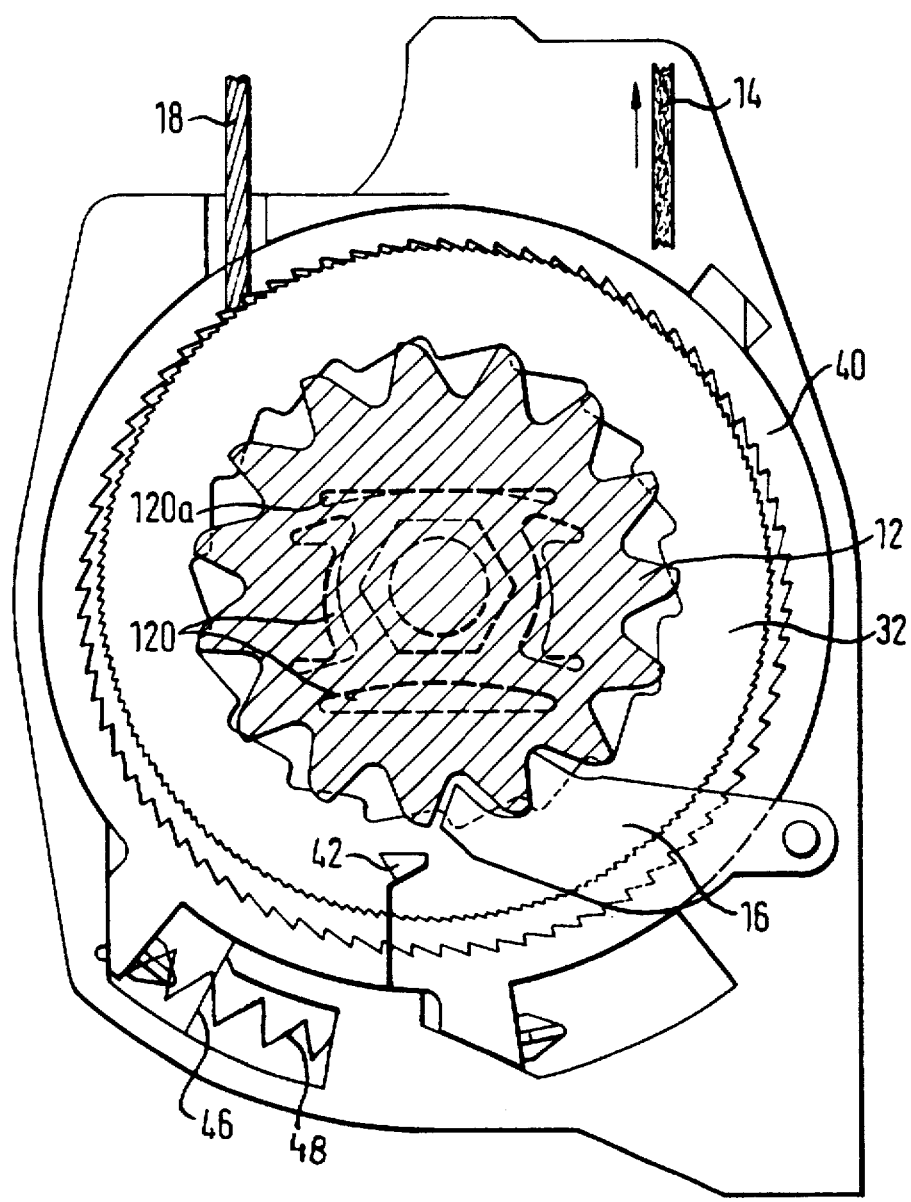
FIG. 6 shows a cross-sectional view corresponding to FIG. 5 in normal blocked position of the belt reel without belt tensioning.

FIG. 6 shows the situation in the belt retractor with the normal blocking function when the pawl 16 engages in an appropriate toothed gear of belt reel 12. The normal blocking function of the belt retractor is effected by a pulling movement in belt webbing 14. When the belt webbing 14 is pulled upwards, this results in a torque in the inner wheel 32, which partly supports itself on the pawl 16 and thus leads to a radial upward movement of the inner wheel 32 until its external coupling toothing supports itself in the internal coupling toothing of the outer ring 40. The recesses 120 permitting this movement are also indicated in FIG. 6. When the inner wheel 32 is moved upwards, it is compressed so that an upper recess 120a even disappears in some cases.

Figure 7:
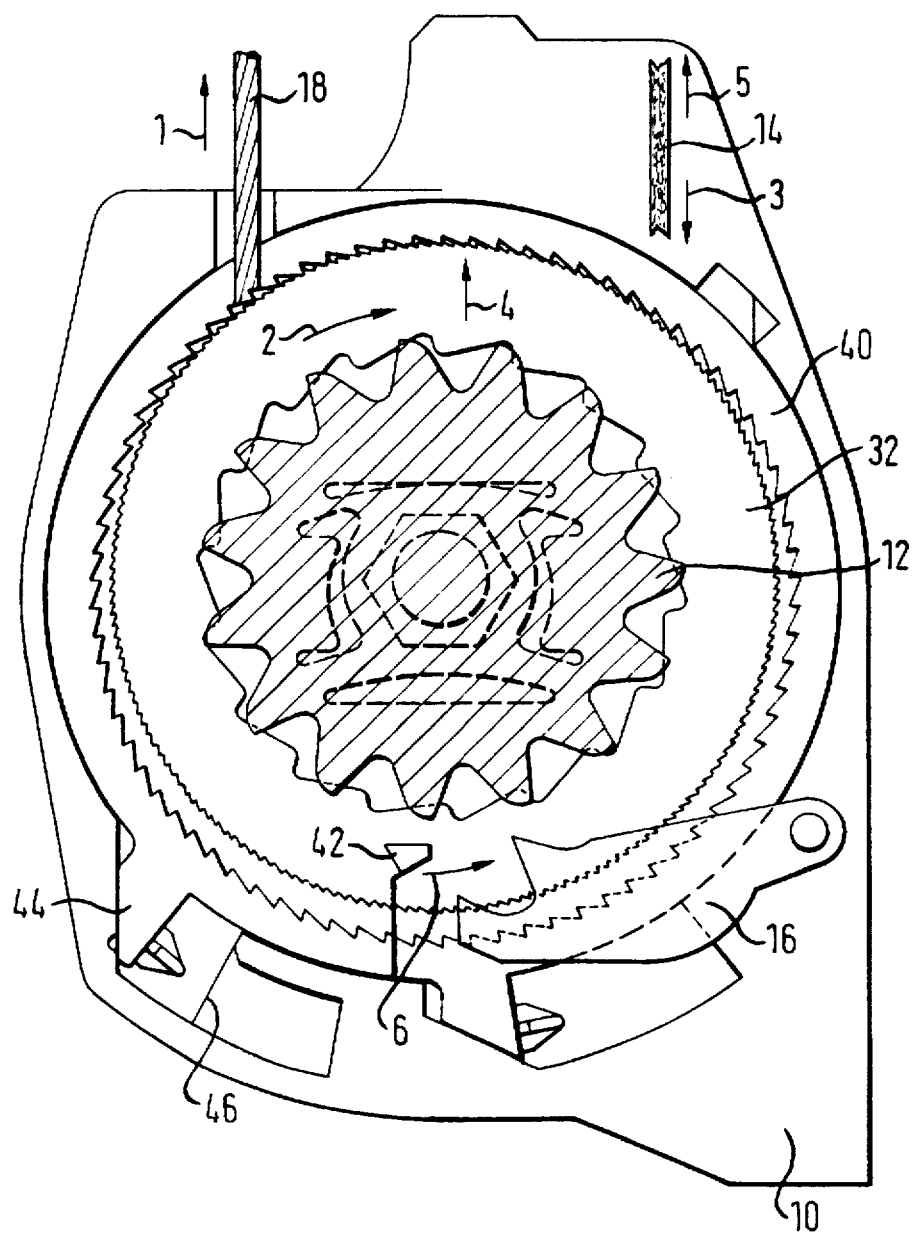
FIG. 7 shows a cross-sectional view corresponding to FIG. 5 showing the belt retractor in accordance with the invention in the phase after belt tensioning has been completed.

The successive sequences during activation of the belt tensioner drive unit are indicated by the numbered arrows in FIG. 7. When the belt is tensioned in the direction of arrow 1, torque acts on the circumference of the cable reel 20 via the draw cable 18 in a familiar manner. Through the resulting rotation of the cable reel 20, first the pawls 24 of the ratchet wheel 22 are moved to engage with the internal coupling toothing of the inner wheel 32, so that the cable reel 20, the ratchet wheel 22, the inner wheel 32 and the torsion bar 30 are fixedly coupled to each other. The rotation of the cable reel 20 is transmitted to the belt reel 12 by means of the torsion bar 30. This belt reel is driven in winding direction 2 so that the loose belt is pulled out of the safety belt system and the belt webbing 14 is tensioned. After tensioning is completed, the two ratchet wheels 22 and 32 remain coupled to each other, so that the torsion bar 30 is still connected to the cable reel 20 in such a way that they cannot rotate in relation to each other.

Figure 8:
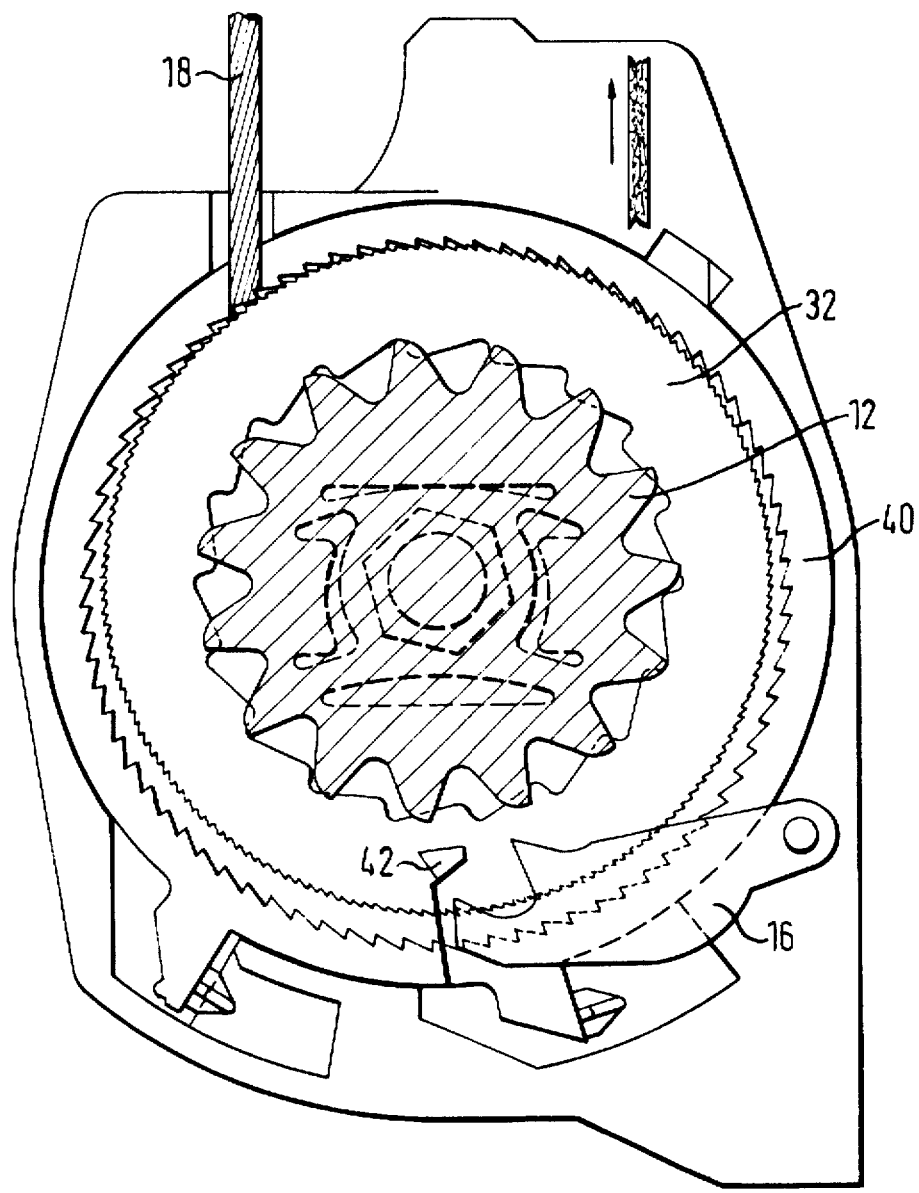
FIG. 8 shows a cross-sectional view corresponding to FIG. 5 showing the belt retractor during the forward movement of the vehicle occupants when the belt retractor is used as a force limiter.

During belt tensioning, the force of the belt tensioner via the engaged first coupling mechanism produces a counterforce in accordance with arrow 3 in the belt webbing 14, which leads to a radial movement of the torsion bar 30 on the belt tensioner side and thus of the inner wheel 32 in accordance with arrow 4 upwards against the restoring force occurring through the bearing plate 70 in the course of its yielding deformation. In FIG. 4 it can easily be seen that the movement of the torsion bar 30 leads to an elastic deformation of the bearing plate 70, which leads to the uppermost recess 120a disappearing in some cases through opposite walls being pressed against each other. This is also shown in FIGS. 6 to 8. In the embodiment shown in FIG. 2, the torsion bar 30 is also pressed upwards in the direction of the arrow when the belt is tensioned, causing the inner wheel 32 to be pushed upwards as well until its external coupling toothing strike the internal coupling toothing of the outer ring 40. During this movement there is a deformation of the inner wheel 32 in the region of the recesses 110 and of the belt reel in the region of recesses 111. Although the coupling toothings engage with each other after the movement of the inner wheel 32, the inner wheel can still rotate in the direction of the arrow 2, since the saw-toothings allow a rotating movement in only one direction, i.e. in the opposite direction to the arrow 2.

During the short phase between the tensioning process and the subsequent forward movement of the occupant, the internal and external coupling toothing remain engaged, i.e. the second coupling mechanism remains in the locked position which it had adopted during the tensioning process.

As soon as a forward movement of the occupant takes place, a pull effect takes place in the belt webbing 14 in the direction of the arrow 5, which leads to a rotation of the inner wheel 32 in the direction of the arrow 6. The outer ring 40 is also engaged directly, that is, without any time delay, through the coupling toothing. This causes the outer ring to rotate in the direction of arrow 6 together with its radial cam 42 until the latter is located above the pawl 16, so that the pawl 16 cannot reach its lock-in position during the forward movement. This is shown in FIG. 8. The forward movement causes a high load level in the safety belt system, and a correspondingly high torque acts on the belt reel 12 through the belt webbing 14. However, since the torsion bar 30 is interposed between the belt reel 12 and the inner wheel 32, the torsion bar 30 can rotate and become plastically deformed. This plastic deformation uses up energy and the load peaks occurring in the belt webbing 14 are largely absorbed. Through appropriate dimensioning and selection of material, the threshold at which plastic deformation of the torsion bar 30 begins as well as its further behaviour and the resulting damping effect can be adjusted practically infinitely.

When the load on the belt webbing 14 is then removed, the coupling mechanisms disengage. The outer ring 40 is also turned back to its initial position by the spring located between the limit stop 46 and its limit stop part 44, thus enabling the retracting function as well as the automatic blocking device.

A further advantage of the shown belt retractor is that the torsion bar 30, which acts as a force limiter, is only twisted to the extent that it also acts as a force limiter when prior tensioning has taken place.

We claim:

1. A safety belt retractor having a housing, a belt reel rotatable in a belt winding and in a belt unwinding direction, a belt wound around said belt reel, an automatic blocking device for said belt reel, a torsion bar having first and second opposite ends, said second opposite end being connected to said belt reel, a belt tensioner acting on said belt reel, a first coupling mechanism arranged between said belt tensioner and said belt reel, said first coupling mechanism being connected to said first end of said torsion bar and being adapted to establish a force flow between said belt tensioner and said belt reel upon actuation of said belt tensioner, a second coupling mechanism connected to said first end of said torsion bar and having a plurality of parts adapted to engage each other and to establish a force flow between said housing and said belt reel after said belt has been tensioned and upon movement of said belt reel in said belt unwinding direction, at least one radially yieldable bearing associated with said second coupling mechanism allowing said parts of said second coupling mechanism to be moved radially towards each other during tensioning of said belt to engage each other, and a deactivation device for said automatic blocking device, said deactivation device being connected to said second coupling mechanism.

2. Belt retractor in accordance with claim 1, wherein said belt tensioner exerts a force on said second coupling mechanism which generates a counter force through said belt webbing, said force and counter force leed to said radial movement of said parts of said second coupling mechanism towards each other.

3. Belt retractor in accordance with claim 1, wherein said parts of said second coupling mechanism which are radially movable towards each other are an outer ring and an inner wheel interlockable with each other.

4. Belt retractor in accordance with claim 3, wherein each of said outer ring and said inner wheel have an internal and an external toothing in the form of a saw-toothing.

5. Belt retractor in accordance with claim 3, wherein said inner wheel is permanently connected to said torsion bar in such a way that both cannot rotate in relation to each other, said outer ring is rotatably mounted and has radial cams to deactivate said blocking mechanism when said torsion bar rotates in said belt unwinding direction and wherein a limit stop is provided limiting rotation of said outer ring and establishing said force flow between said housing and said belt reel via said torsion bar and said outer ring.

6. Belt retractor in accordance with claim 3, wherein said inner wheel is radially flexibly mounted.

7. Belt retractor in accordance with claim 6, wherein said inner wheel is made of plastic.

8. Belt retractor in accordance with claim 7, wherein said inner wheel has a flexible section forming said radially yielding bearing.

9. Belt retractor in accordance with claim 1, wherein said radially yielding bearing encompasses a flexible plastic part.

10. Belt retractor in accordance with claim 9, wherein some of said parts of said second coupling mechanism are connected to said plastic part which has recesses to facilitate radial movement of said parts connected to it.

11. Belt retractor in accordance with claim 1, wherein said torsion bar is radially yieldingly mounted on the one of its ends which is closer to said belt tensioner, so that tensioning results in a radial shift of said torsion bar and movement of parts of said second coupling mechanism mounted on it.

12. Belt retractor in accordance with claim 10, wherein said torsion bar includes an extension and said first coupling mechanism includes a part rotatably mounted on said extension.

13. Belt retractor in accordance with claim 11, wherein a radially yielding bearing plate is provided for said torsion bar, allowing the latter to move radially.

14. Belt retractor in accordance with claim 1, wherein a cable reel is provided on which a draw cable is wound, said draw cable being coupled to a belt tensioning drive and displaced upon triggering of said belt tensioning drive in order to rotatably drive said cable reel which is radially yieldingly mounted so that those parts of the second coupling mechanism which are connected to it are radially movable.

15. Belt retractor in accordance with claim 14, wherein said cable reel has a yieldable bearing extension integrally connected to it.

16. Belt retractor in accordance with claim 1, wherein said first coupling mechanism has a pawl coupling comprising:

a ratchet wheel having a circumferential surface, said ratchet wheel being drivingly connected to said belt tensioner and having a pawl on said circumferential surface, said pawl swinging outwards and being rotatably mounted on said torsion bar; and a cylindrical wheel having an inertial coupling toothing allocated to said pawls, said cylindrical wheel encompasses said ratchet wheel and is connected to said torsion bar in a non-rotatable manner;

said cylindrical wheel comprising an internal coupling toothing;

said pawls swinging out upon actuation of the belt tensioner and engaging said internal coupling toothing of said cylindrical wheel.

17. Belt retractor in accordance with claim 3, wherein said first coupling mechanism has a pawl coupling comprising:

a ratchet wheel having a circumferential surface, said ratchet wheel being drivingly connected to said belt tensioner and having a pawl on said circumferential surface, said pawl swinging outwards and being rotatably mounted on said torsion bar; and a cylindrical wheel having an inertial coupling toothing allocated to said pawls, said cylindrical wheel encompasses said ratchet wheel and is connected to said torsion bar in a non-rotatable manner;

said cylindrical wheel comprising an internal coupling toothing;

said pawls swinging out upon actuation of the belt tensioner and engaging said internal coupling toothing of said cylindrical wheel.

18. Belt retractor in accordance with claim 17, wherein said inner wheel of said second coupling mechanism forms said cylindrical wheel of said first coupling mechanism.

* * * * *